(12) United States Patent
Ji et al.

(10) Patent No.: US 11,858,589 B1
(45) Date of Patent: Jan. 2, 2024

(54) WAVE-DISSIPATING AND WAVE-RESISTING INTEGRATED FLOATING PHOTOVOLTAIC DEVICE CAPABLE OF RESISTING SEVERE SEA CONDITIONS

(71) Applicant: Jiangsu university of science and technology, Jiangsu (CN)

(72) Inventors: Chunyan Ji, Jiangsu (CN); Fali Huo, Jiangsu (CN); Jianting Guo, Jiangsu (CN); Yong Cheng, Jiangsu (CN); Sheng Xu, Jiangsu (CN)

(73) Assignee: Jiangsu university of science and technology, Jiangsu (CN)

( * ) Notice: Subject to any disclaimer, the term of this patent is extended or adjusted under 35 U.S.C. 154(b) by 0 days.

(21) Appl. No.: 18/314,156

(22) Filed: May 9, 2023

(30) Foreign Application Priority Data

May 23, 2022 (CN) .......................... 202210561805.8

(51) Int. Cl.
| | |
|---|---|
| *B63B 1/40* | (2006.01) |
| *B63B 1/14* | (2006.01) |
| *B63B 35/44* | (2006.01) |
| *B63B 43/18* | (2006.01) |
| *H02S 30/10* | (2014.01) |
| *H02S 10/40* | (2014.01) |

(52) U.S. Cl.
CPC .................. *B63B 1/40* (2013.01); *B63B 1/14* (2013.01); *B63B 35/44* (2013.01); *B63B 43/18* (2013.01); *H02S 10/40* (2014.12); *H02S 30/10* (2014.12); *B63B 2035/4453* (2013.01)

(58) Field of Classification Search
CPC .... B63B 1/00; B63B 1/14; B63B 1/40; B63B 2035/4453; B63B 35/00; B63B 35/44; B63B 43/00; B63B 43/18; H02S 10/40; H02S 30/10; H02S 20/32
USPC ........................................................ 114/61.2
See application file for complete search history.

(56) References Cited

U.S. PATENT DOCUMENTS

| | | | |
|---|---|---|---|
| 9,729,101 B1 * | 8/2017 | Schmaelzle | ............. B63B 21/50 |
| 11,799,413 B2 * | 10/2023 | Forrest | .................... B63B 35/44 |

FOREIGN PATENT DOCUMENTS

| | | |
|---|---|---|
| CN | 208963284 | 6/2019 |
| CN | 110450916 | 11/2019 |
| CN | 111641371 | 9/2020 |
| CN | 114517461 | 5/2022 |
| JP | 6564515 | 8/2019 |

* cited by examiner

*Primary Examiner* — Lars A Olson
(74) *Attorney, Agent, or Firm* — JCIPRNET

(57) ABSTRACT

The present disclosure provides a wave-dissipating and wave-resisting integrated floating photovoltaic device capable of resisting severe sea conditions, comprising at least one floating photovoltaic unit, wherein the floating photovoltaic units are connected through connecting pieces, and the connecting pieces can avoid collision between the floating photovoltaic units. The floating photovoltaic unit comprises a floating system, photovoltaic systems and a walkway system; the floating system is used for supporting the photovoltaic systems and bearing wave load impact; the photovoltaic systems are photovoltaic power generation systems; the walkway system is arranged between the photovoltaic systems, and the walkway system provides convenience for later maintenance of the floating photovoltaic device.

6 Claims, 11 Drawing Sheets

WAVE-DISSIPATING AND WAVE-RESISTING INTEGRATED FLOATING PHOTOVOLTAIC DEVICE CAPABLE OF RESISTING SEVERE SEA CONDITIONS

CROSS-REFERENCE TO RELATED APPLICATION

This application claims the priority benefit of Chinese application serial no. 202210561805.8, filed on May 23, 2022. The entirety of the above-mentioned patent application is hereby incorporated by reference herein and made a part of this specification.

BACKGROUND

Technical Field

The present invention relates to the technical field of offshore photovoltaic power generation platforms, in particular to a wave-dissipating and wave-resisting integrated floating photovoltaic device capable of resisting severe sea conditions.

Description of Related Art

As humans gradually realize the depletion of fossil energy and the damage to the environment during use, green energy such as wind, solar, and wind wave energy has been vigorously developed. The solar energy has been vigorously developed due to its irreplaceable advantages, but the most widely used at present is to install solar photovoltaic panels on land. However, the development of solar power generation on land has certain limitations. Firstly, it occupies a large amount of valuable land resources, and secondly, it needs to be installed in areas with good lighting conditions.

The total length of China's coastline is about 32,000 kilometers, with a marine territory area of 2.997 million square kilometers. Therefore, it is of great practical value to provide photovoltaic modules on the sea surface for photovoltaic power generation. Firstly, building photovoltaic power stations at sea can effectively save land resources and have minimal impact on the marine ecological environment; secondly, the sea surface is relatively open, which can effectively avoid the constraints of shadows on the efficiency of photovoltaic modules, thereby greatly improving the power generation efficiency. However, the maritime environment is complex, and environments such as wind, waves, and currents can cause photovoltaic modules to sway with the waves, thereby affecting the power generation efficiency. Therefore, water power generation in China is mostly used in lakes or shallow areas at present. Hence, reducing the impact of the marine environment on photovoltaic modules is a prerequisite for implementing offshore photovoltaic power stations.

At present, in order to reduce the impact of offshore wind, wave, and current loads on marine structures, many scholars at home and abroad have conducted extensive research on wave dissipation methods, had many achievements, and designed some wave-dissipating devices. However, most of the research is based on the wave-dissipating device itself, and there is relatively little research on the integration of small offshore platforms and wave-dissipating devices. Based on the above points, a wave-dissipating and wave-resisting integrated floating photovoltaic device capable of resisting severe sea conditions is designed.

SUMMARY

The present invention is intended to provide a wave-dissipating and wave-resisting integrated floating photovoltaic device with a simple overall structure, capable of resisting severe sea conditions, convenient construction, and high large-area laying efficiency, in response to the aforementioned problems.

The purpose of the present invention is realized through the following technical solution: a wave-dissipating and wave-resisting integrated floating photovoltaic device capable of resisting severe sea conditions, comprising at least one floating photovoltaic unit, wherein the floating photovoltaic units are connected through connecting pieces to form a floating photovoltaic device, and the floating photovoltaic device is fixed through a mooring system, to ensure its safety under severe sea conditions; a protective zone with relatively moderate sea conditions is formed in the targeted sea area, for arranging other marine structures that cannot rely on themselves for wave dissipation and resistance; the connecting pieces may avoid collision between the floating photovoltaic units; the floating photovoltaic unit comprises a floating system, photovoltaic systems and a walkway system; the floating system is used for supporting the photovoltaic systems and bearing wave load impact; the photovoltaic systems are photovoltaic power generation systems of the floating photovoltaic device; the walkway system is arranged between the photovoltaic systems, and the walkway system provides convenience for later maintenance of the floating photovoltaic device.

The floating photovoltaic units are connected through rubber rings to form a single row array distribution or a regional array distribution. The single row array or regional array is fixed to the water bottom through a mooring system to ensure its safety under severe sea conditions. The floating photovoltaic device can rely on their own characteristics to dissipate waves, and a protective zone with relatively moderate sea conditions is formed behind the floating photovoltaic device for aquaculture and laying ordinary photovoltaic. By raising the photovoltaic system through a floating system and the wave attenuation effect of the floating system itself, it can prevent the occurrence of surging waves during operation, thereby affecting the normal operation of the photovoltaic panel.

Preferably, the floating system is a wave-dissipating floating body arranged along a square area by resonant wave dissipation.

Preferably, the wave-dissipating floating body comprises two circular cross-section floating bodies and two square cross-section floating bodies; the two circular cross-section floating bodies are parallel and respectively arranged on the wave facing side and the back wave side, and the square cross-section floating bodies are connected to the two circular cross-section floating bodies; the square cross-section floating bodies are vertically connected to the circular cross-section floating bodies, and the wave-dissipating floating body is provided with a cross shaped square cross-section floating body in the middle.

The circular cross-section floating bodies are respectively arranged on the back wave side and the wave facing side, and the cylinder cross-section floating bodies can effectively carry wave loads; the wave-dissipating floating body is provided with a cross shaped square cross-section floating body in the middle to effectively improve the wave dissipation effect of the wave-dissipating floating body; the circular cross-section floating bodies capable of effectively carrying wave loads are combined with the cross shaped square cross-section floating body capable of effectively improving the wave dissipation effect of the wave-dissipating floating body to form a floating system which can effectively protect the photovoltaic system and ensure the normal operation of the photovoltaic system.

Preferably, several connecting columns are provided outside the four sides of the wave-dissipating floating body, and the connecting columns comprises two parallel protruding parts; a cylindrical rod is provided between the two protruding parts, and the cylindrical rod is perpendicular to the protruding part; the connecting column of the floating photovoltaic unit is connected with the connecting column of another floating photovoltaic unit through connecting pieces. The floating photovoltaic units are connected through connecting columns to form a single row array or regional array as needed, with high modular degree, convenient construction and high large-area laying efficiency.

Preferably, the photovoltaic system comprises a support structure and a photovoltaic module; the support structure comprises several I-shaped steels and several square-shaped steels, and the wave-dissipating floating body is provided with several grooves on opposite sides; the I-shaped steels are arranged in an array along the length direction of the wave-dissipating floating body and embedded with the wave-dissipating floating body through the grooves, and the square-shaped steels are provided on the I-shaped steels to carry the photovoltaic module; a groove is arranged on a circular cross-section floating body, and I-shaped steel is embedded in the groove to form a connection between the photovoltaic system and the floating system. The photovoltaic system is embedded on the circular cross-section floating body through its own circular shape characteristics, and then connected by bolts or welding, enhancing the overall structural strength of the floating system and ensuring the working stability of the entire floating photovoltaic device; the I-shaped steel and square-shaped steel are steel, and the I-shaped steel is the main strength component that directly overlaps with the wave-dissipating floating body to carry the gravity load of the photovoltaic module and the wave load transmitted through the wave-dissipating floating body; the square-shaped steel is an auxiliary component arranged according to the position of the I-shaped steel, and used to strengthen the weak parts of the photovoltaic system structure.

The photovoltaic module comprises several reinforced crossbeams, several roof supports, thin crossbeams, thick crossbeams, photovoltaic panels, wherein the thick crossbeams are thicker than the thin crossbeams; part of the reinforced crossbeams is arranged in an array along the length direction of the wave-dissipating floating body to form a lower reinforced crossbeam layer, while the other part of reinforced crossbeams is arranged on the lower reinforced crossbeam layer to form an upper reinforced crossbeam layer; the upper reinforced crossbeam layer and the lower reinforced crossbeam layer are vertically arranged and connected through an automatic connecting device; the several roof supports are arranged in an array on the lower reinforced crossbeam layer, and the upper reinforced crossbeam layer is located on both sides of the roof support; the thin crossbeam is arranged near the top of the roof support, and the thick crossbeam is arranged near the bottom of the roof support; the photovoltaic panel is arranged on the roof support through the thin crossbeam and the thick crossbeam.

The reinforced crossbeam is a square-shaped steel pipe, arranged on the I-shaped steel to carry the load transmitted from the I-shaped steel. The roof support is made of aluminum alloy, with a shape similar to the roof The bottom of the roof support is connected to the reinforced crossbeam through bolts and nuts. The thin crossbeam and thick crossbeam are square pipe fittings made of aluminum alloy, and four thin crossbeams and two thick crossbeams are provided on each roof suppor. The thin crossbeams are located near the roof support, and the thick crossbeams are located near the bottom of the roof support; the size difference between the thin crossbeam and the thick crossbeam provides component support for the layout of the photovoltaic panel.

Preferably, the automatic connecting device comprises a snap-on gripper, a base, a button, a ratchet, a firing pin and a spring; the base is arranged on the lower reinforced crossbeam layer, and both ends of the base are provided with "L" shaped notches; the firing pin is arranged in the "L" shaped notch; one end of the firing pin is matched with the ratchet, and the other end of the firing pin is connected with the spring; the spring is arranged in the base, and the button is inverted-T shaped; both the lower ends of the button are in contact with the firing pin, and the ratchet is connected to the snap-in gripper.

The snap-on gripper grips the photovoltaic module through its own structure. During installation, the upper reinforced crossbeam layer is placed on the base. The lower structure of the button will press the firing pin down from the longitudinal notch to the transverse groove through its own weight by pressing the button. When the firing pin reaches the transverse notch, it will be pushed towards the ratchet under the action of the spring. The spring is installed in the groove between the firing pin and the base, and the snap-on gripper and the ratchet are fixedly connected to rotate together. At this point, the reed of the ratchet rotates and clamps the upper reinforced crossbeam layer, and the firing pin will prevent the ratchet from rotating in the opposite direction. The fixed connection through an automatic connecting device has the advantages of convenient disassembly and easy installation.

Preferably, the joint between the lower reinforced crossbeam layer and the end of the upper reinforced crossbeam layer is provided with a stop device, and the stop device is provided with bolt holes; the stop device is connected with the lower reinforced crossbeam layer through bolts and nuts, and the stop device is provided with a stop block; the height of the stop block is greater than the height of the two reinforced crossbeam layers.

The protruding stop block on the upper part of the stop device can limit the movement of the photovoltaic module connected by the snap-on gripper of the automatic connecting device along the length direction of the reinforced crossbeam.

Preferably, the walkway system comprises several aluminum alloy walkway panels; both sides of the walkway panel are provided with connecting structures along the width direction, and the walkway system is connected with the photovoltaic system through the connecting structure.

Preferably, the walkway system is arranged on both sides of the roof support, for later maintenance and replacement of photovoltaic modules.

Preferably, the connecting piece is a rubber ring. The connecting columns on the wave-dissipating floating body are flexibly connected through rubber rings. Its advantage is to ensure its own movement trend of each floating photovoltaic unit, and to disperse the external force of wave action on the entire floating photovoltaic device as much as possible. The material properties of the rubber rings themselves can to some extent avoid collision between floating photovoltaic units.

The present invention has the following beneficial effects:
1. the present invention improves the floating photovoltaic floating system by adopting a large modular design of floating bodies (i.e., the splicing of circular and square floating bodies); the circular cross-section floating bodies can effectively carry wave loads and achieve the purpose of wave dissipation and resistance. In combination with the cross shaped square cross-section floating bodies, the wave dissipation efficiency of the wave-dissipating floating body can be effectively improved. Arranged under severe sea conditions, floating photovoltaic devices can rely on their own characteristics to dissipate sea waves, and a protective zone with relatively moderate sea conditions is formed behind the floating photovoltaic device for aquaculture and laying ordinary photovoltaic.

2. Compared with the traditional water floating photovoltaic, the present invention avoids coupling collision between floating bodies through setting up the major structure of the floating photovoltaic by various steels. At the same time, the photovoltaic system is raised by splicing the steel frame to prevent sea waves from surging during operation, thereby affecting the normal operation of the photovoltaic panel.

3. A large number of steel members are used as supporting members of the floating photovoltaic device in the present invention, so that the structural strength of the floating photovoltaic device is improved. Meanwhile, the modular degree is high, construction is convenient, large-area laying efficiency is high, and the overall structure is simple.

4. The present invention may also be arbitrarily combined into different arrays to further improve its utilization rate according to different water areas. In narrow water areas, the present invention can be spliced into a separate row along the direction of the incoming waves, and a protective zone will be formed behind the present invention for aquaculture and laying ordinary photovoltaic panels. In wide water areas, it can be wrapped in a circle to form a protective zone in the middle for aquaculture and laying ordinary photovoltaic panels.

5. A large number of steel pipes and aluminum alloy pipes are used in the present invention. Due to the inability of steel and aluminum alloy materials to be spliced through traditional welding processes, an automatic connecting device has been designed. This device effectively connects steel pipes and aluminum alloy pipes together through the delicate design of the internal structure, and has the characteristics of convenient installation and easy operation.

6. The floating photovoltaic units of the present invention are flexibly connected through rubber rings. Its advantage is to ensure its own movement trend of each floating photovoltaic unit, and to disperse the external force of wave action on the entire floating photovoltaic device as much as possible. The material properties of the rubber rings themselves can to some extent avoid collision between floating photovoltaic units. The photovoltaic system is embedded on the circular cross-section floating body through its own circular shape characteristics, and then connected by bolts or welding, enhancing the overall structural strength of the floating system and ensuring the working stability of the entire floating photovoltaic device.

DESCRIPTION OF THE EMBODIMENTS

The present invention will be described in detail below in conjunction with the drawings. Technical solutions in the embodiments of the present invention will be described clearly and completely in combination with figures in the embodiments of the invention. Obviously, the described embodiments are only part, but not all, of the embodiments of the invention. Based on the embodiments of the present invention, other embodiments acquired by those of ordinary skill in the art without creative work also belong to the protection scope of the present invention.

It should be noted that the features in the embodiments and the embodiments of the present invention may be combined with each other in a non-conflicting situation.

Figure 1:
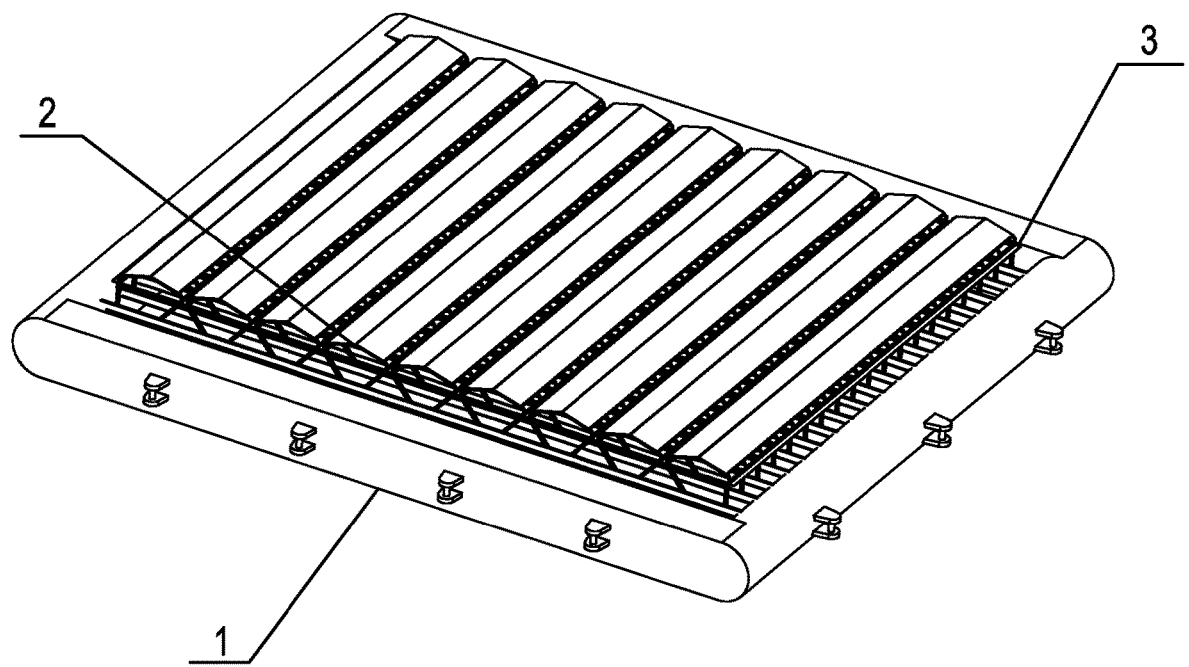
FIG. 1 is an axial side view of the overall structure of the present invention.
Figure 2:
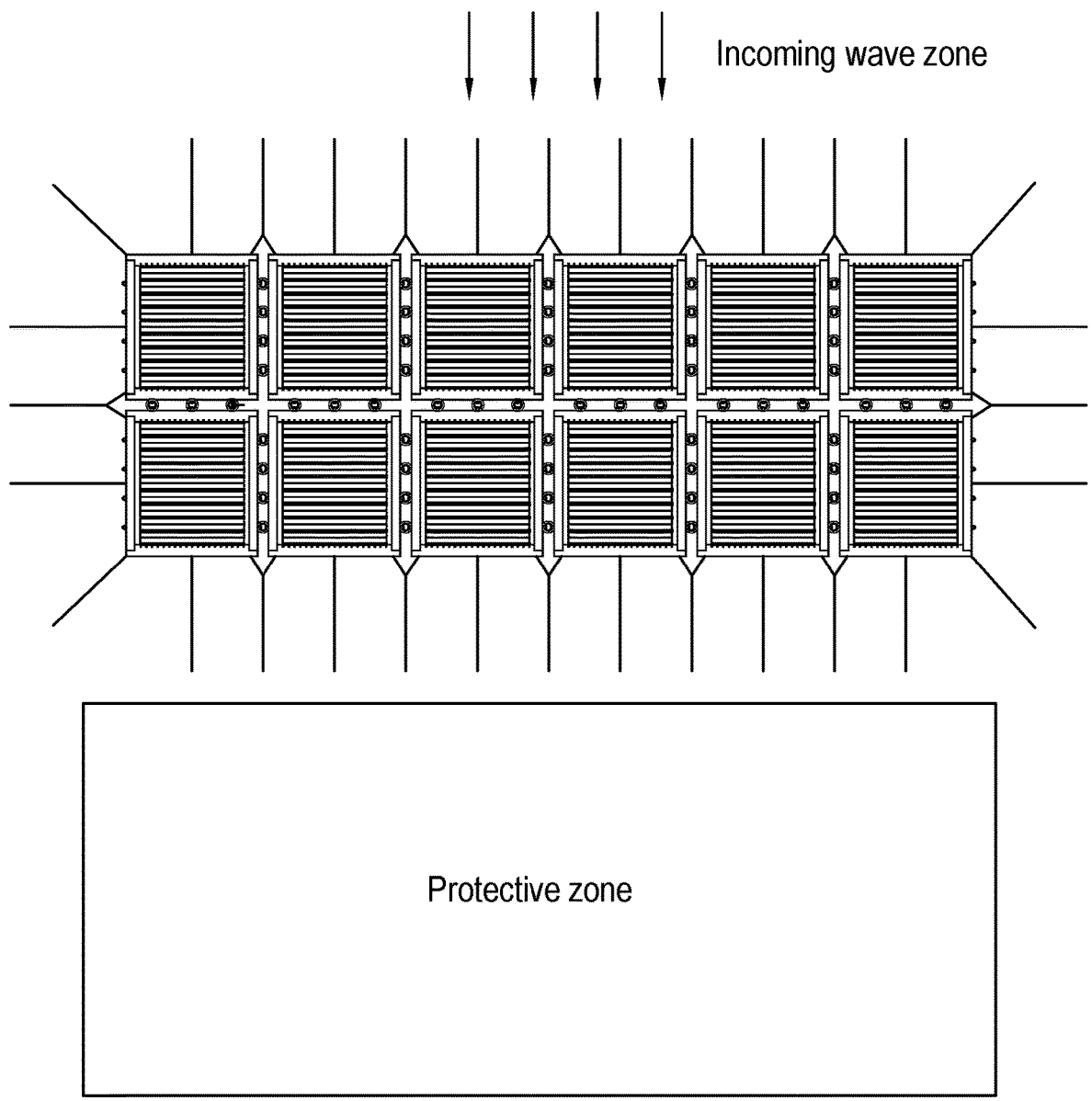
FIG. 2 is a schematic diagram of the single row array distribution of the present invention.
Figure 3:
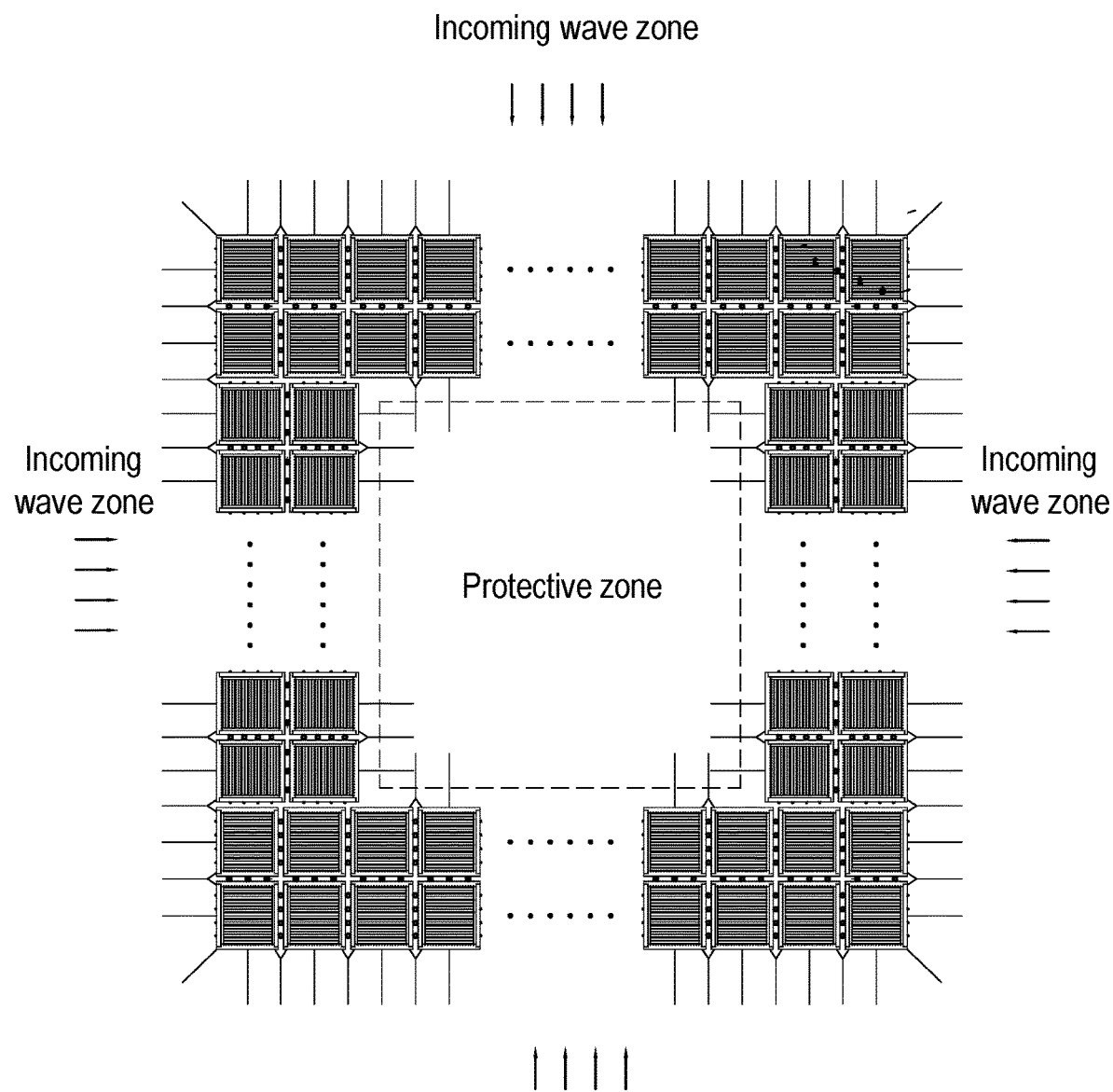
FIG. 3 is a schematic diagram of the regional array distribution of the present invention.

As shown in FIG. 1, the integrated floating photovoltaic device of the present invention can be applied to severe sea conditions, comprising at least one floating photovoltaic unit. The floating photovoltaic units are connected to form a floating photovoltaic device through connecting pieces, which can avoid collision between floating photovoltaic units; as shown in FIGS. 2 and 3, multiple floating photovoltaic units form a single row array or regional array, and the floating photovoltaic array is fixed through a mooring system, to ensure its safety under severe sea conditions; a protective zone with relatively moderate sea conditions is formed in the targeted sea area, for arranging other marine structures that cannot rely on themselves for wave dissipation and resistance; the floating photovoltaic unit comprises a floating system 1, photovoltaic systems 2 and a walkway system 3; the floating system 1 is used for supporting the photovoltaic systems 2 and bearing wave load impact; the photovoltaic systems 2 are photovoltaic power generation systems of the floating photovoltaic device, which are key systems of the photovoltaic power generation systems; the walkway system 3 is arranged between the photovoltaic systems 2, and the walkway system 3 provides convenience for later maintenance of the floating photovoltaic device.

Figure 4:
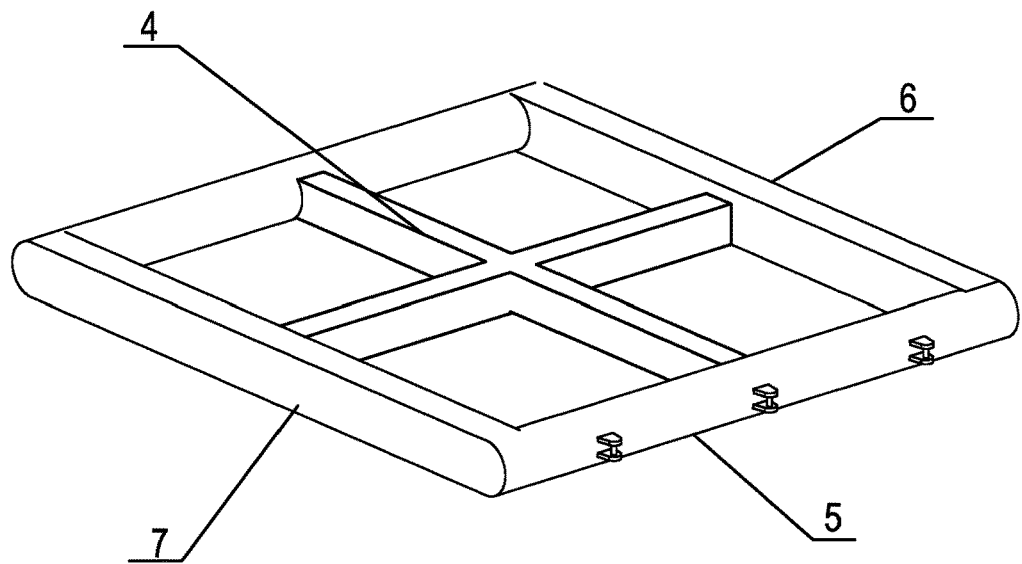
FIG. 4 is an axial side view of the floating system of the present invention.

As shown in FIG. 4, the floating system 1 is a wave-dissipating floating body arranged along a square area by resonant wave dissipation; the cross-sectional shapes of the floating bodies around the area can be divided into two types: circular cross-section floating body 5 and square cross-section floating body 6; two circular cross-section floating bodies 5 are parallel and respectively arranged on the wave facing side and the back wave side of the floating photovoltaic device, mainly carrying wave loads and achieving the purposes of wave dissipation and wave resistance. two square cross-section floating bodies 6 serve as supporting parts, mainly for connecting the circular cross-section floating bodies 5 on both sides; the square cross-section floating bodies 6 are vertically connected with the circular cross-section floating bodies 5, and the wave-dissipating floating body 4 is provided with a cross shaped square cross-section floating body in the middle, which can effectively improve the wave dissipation effect of the wave-dissipating floating body 4. Several integrally formed connecting columns 7 are provided outside the four sides of the wave-dissipating floating body 4, and the photovoltaic system 2 is embedded on the circular cross-section floating body 5 through its own circular shape characteristics.

Figure 5:
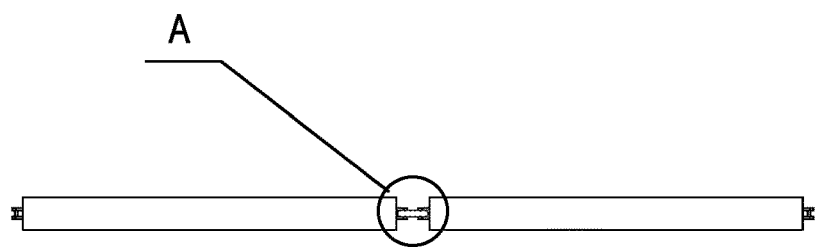
FIG. 5 is a schematic diagram of the connecting structure of the floating photovoltaic units of the present invention.
Figure 6:
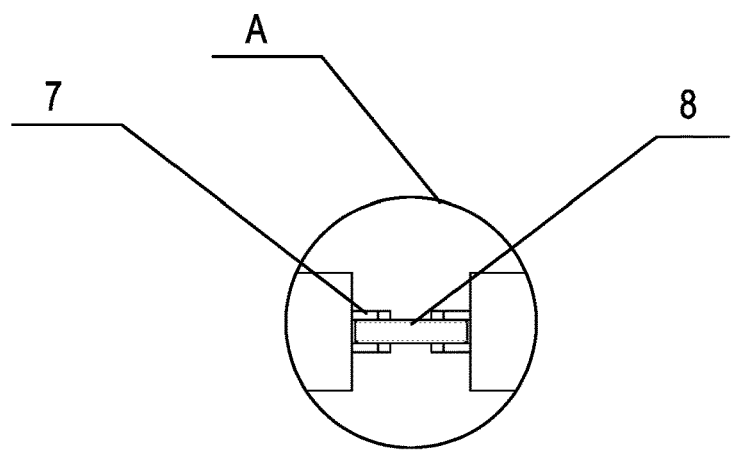
FIG. 6 is an enlarged view of the structure at position A in FIG. 5.

As shown in FIGS. 5 and 6, the connecting columns 7 consist of two protruding parts of the circular cross-section floating bodies 5 and cylindrical rods in the protruding parts, and there are multiple connecting columns 7 on the wave-dissipating floating body 4, which are flexibly connected through rubber rings 8. Its advantage is to ensure its own movement trend of each floating photovoltaic unit, and to disperse the external force of wave action on the entire floating photovoltaic power station as much as possible. The material properties of the rubber ring 8 can to some extent avoid collision between floating photovoltaic units.

Figure 7:
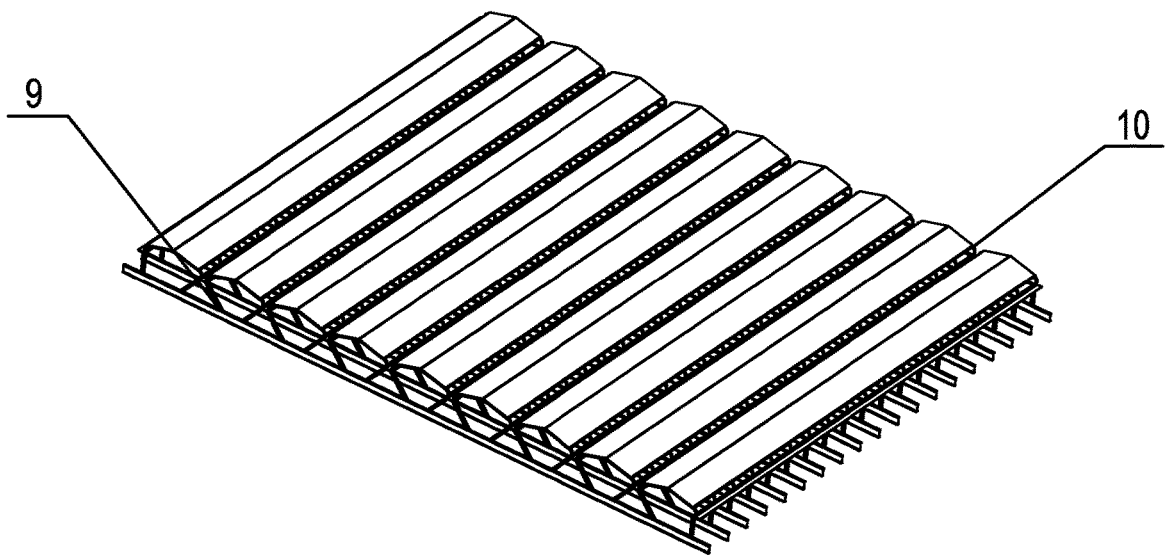
FIG. 7 is an axial side view of the photovoltaic system of the present invention.

As shown in FIG. 7, the photovoltaic system 2 comprises a support structure 9 and a photovoltaic module 10; it is embedded with the groove on the circular cross-section floating body 5, and then connected by bolts or welding, enhancing the overall structural strength of the floating system 1 and ensuring the working stability of the entire floating photovoltaic device.

Figure 8:
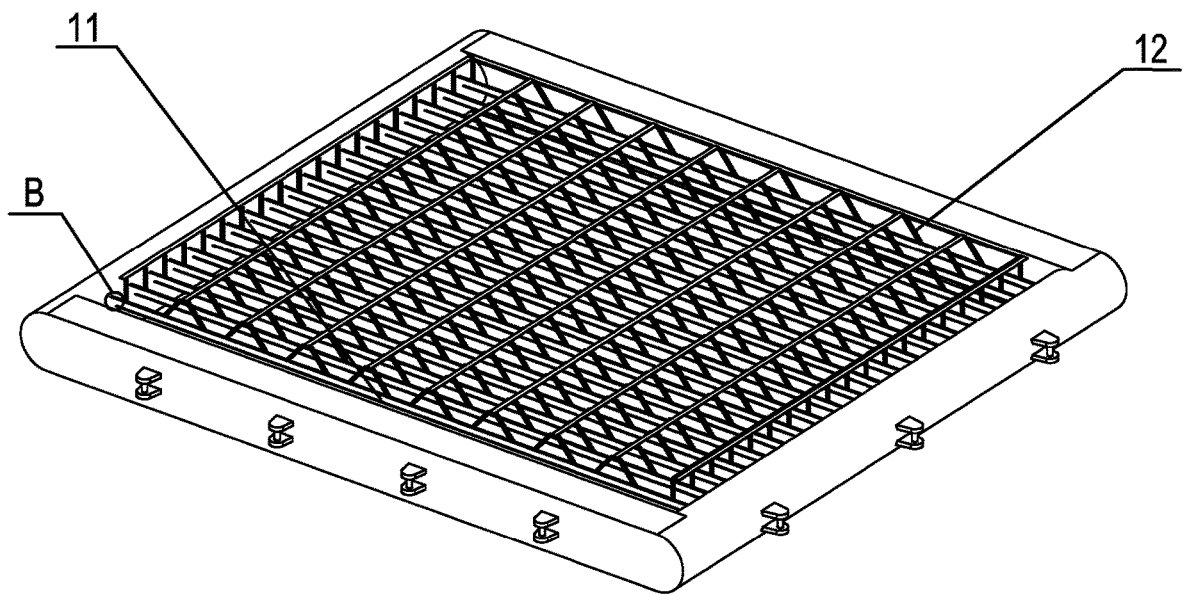
FIG. 8 is a schematic diagram of the support structure of the present invention.
Figure 9:
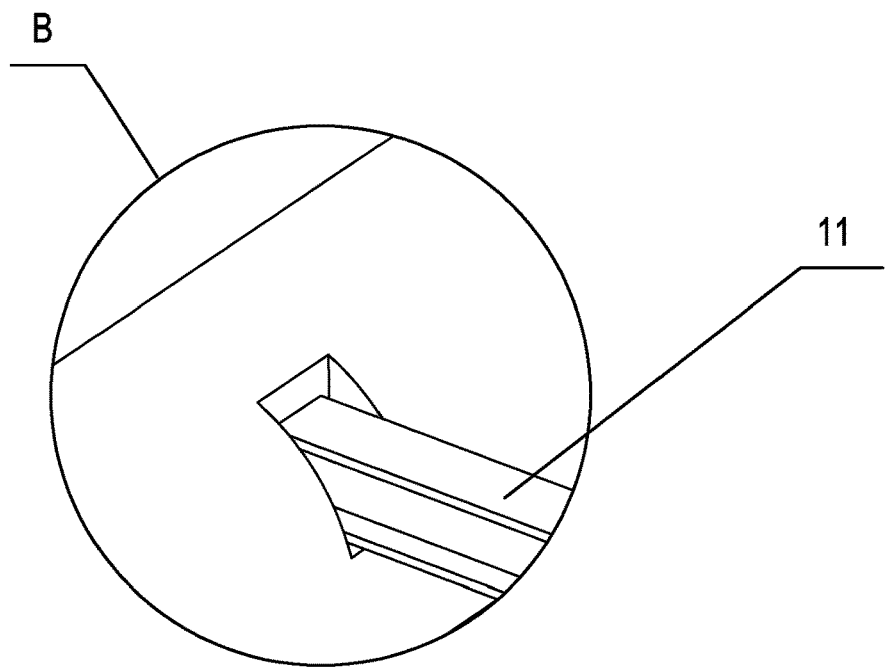
FIG. 9 is an enlarged view of the structure at position B in FIG. 7.

As shown in FIGS. 8 and 9, the support structure 9 comprises several I-shaped steels 11 and several square-shaped steels 12, arranged in an array along the length direction of the circular cross-section floating body 5. The I-shaped steel 11 is the main strength component that directly overlaps with the wave-dissipating floating body 4 to carry the gravity load of the photovoltaic module 10 and the wave load transmitted through the wave-dissipating floating body 4. The square-shaped steel 12 is an auxiliary component arranged according to the position of I-shaped steel 11, and arranged in a "herringbone" shape on the I-shaped steel 11 to strengthen the relatively weak parts of the photovoltaic system 2 structure.

Figure 10:
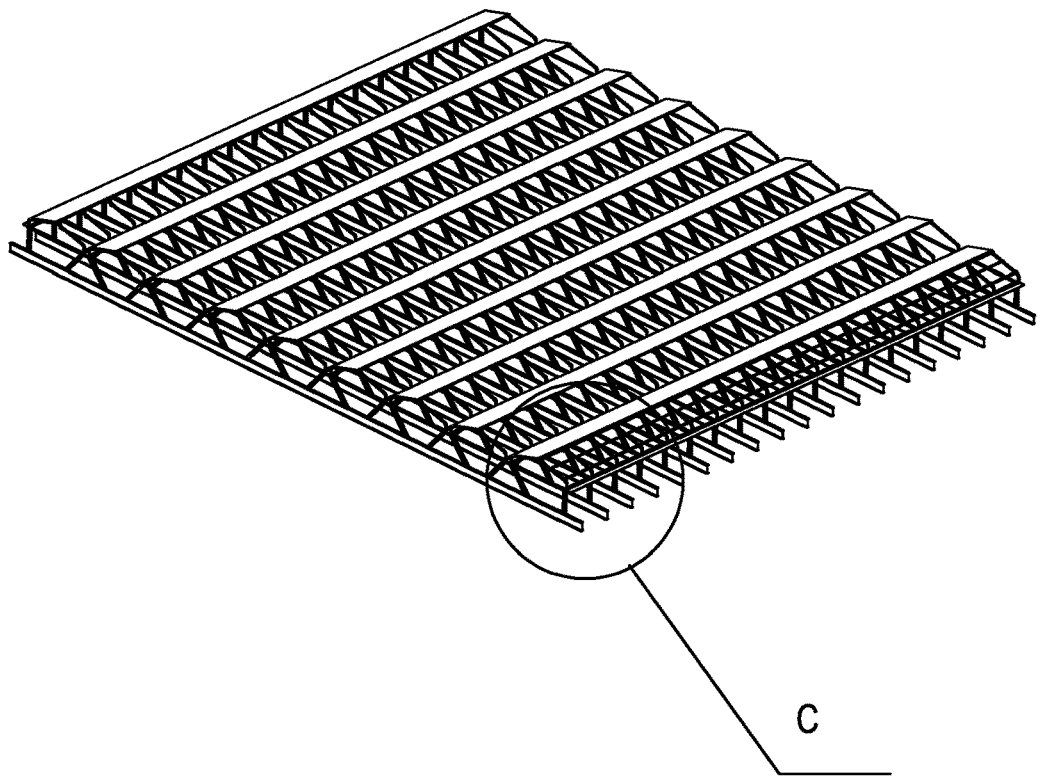
FIG. 10 is a structural diagram of the photovoltaic module of the present invention.
Figure 11:
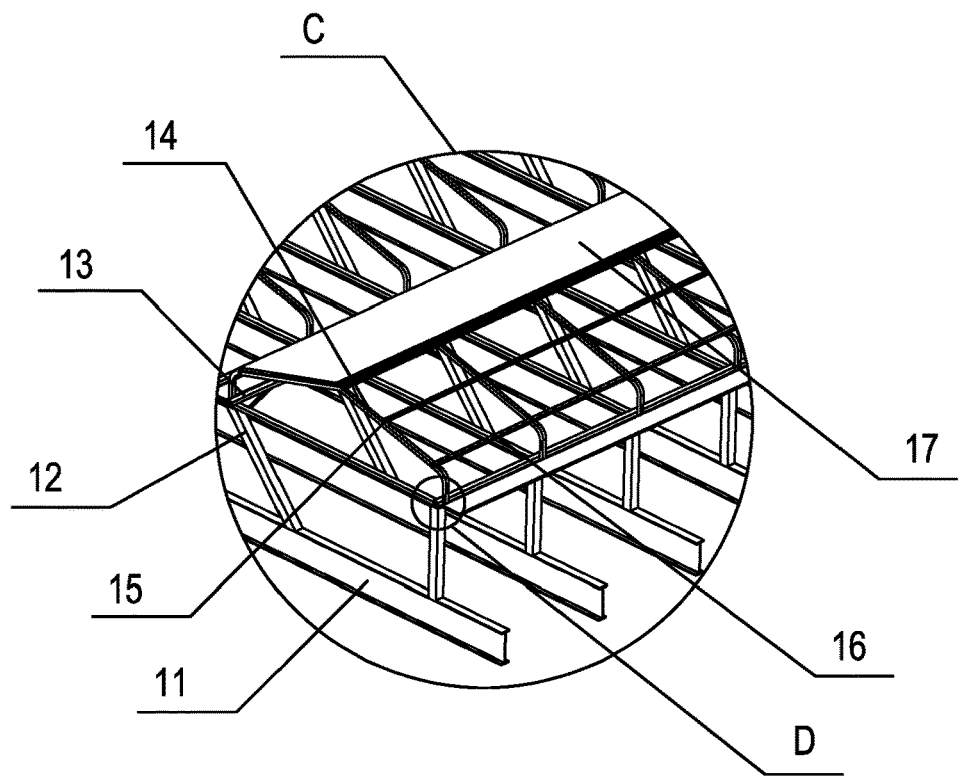
FIG. 11 is an enlarged view of the structure at position C in FIG. 10.
Figure 12:
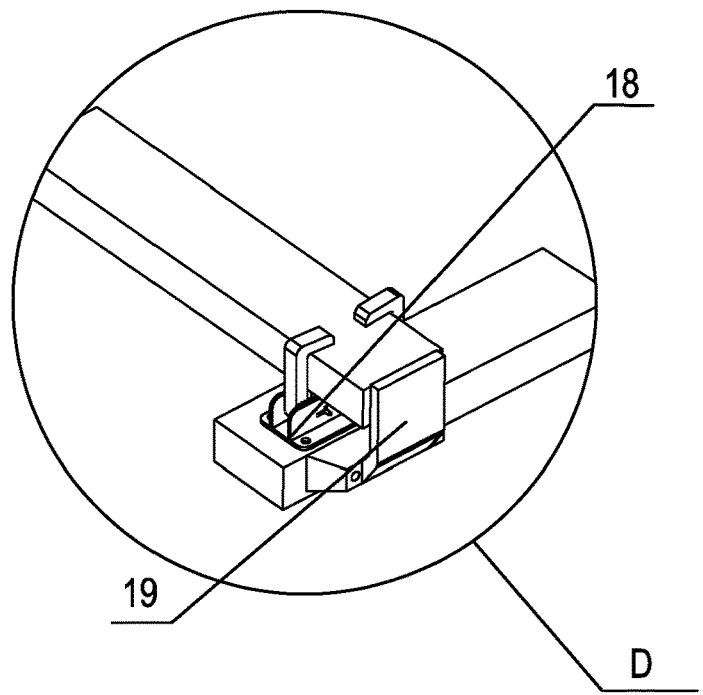
FIG. 12 is an enlarged view of the structure at position D in FIG. 11.
Figure 13:
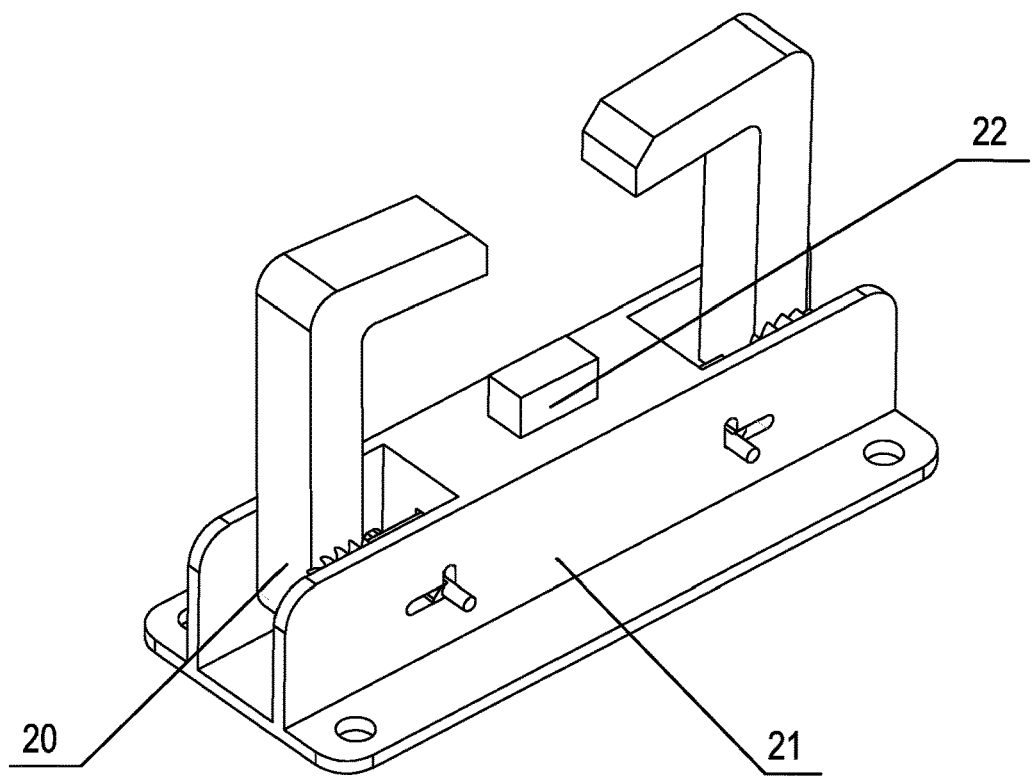
FIG. 13 is a schematic diagram of the automatic connecting device of the present invention.
Figure 14:
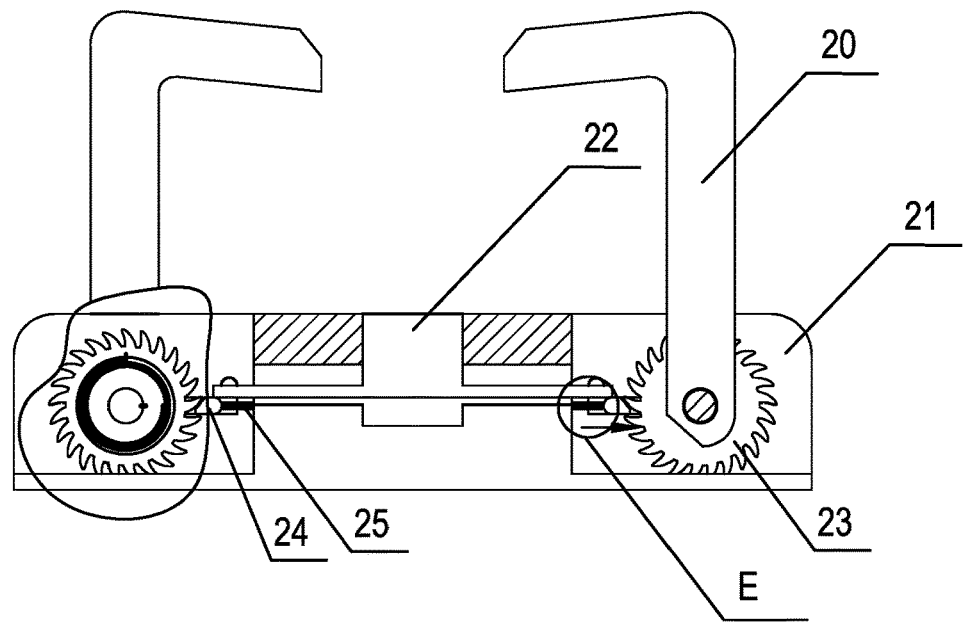
FIG. 14 is a schematic diagram of the internal structure of the automatic connecting device of the present invention.
Figure 15:
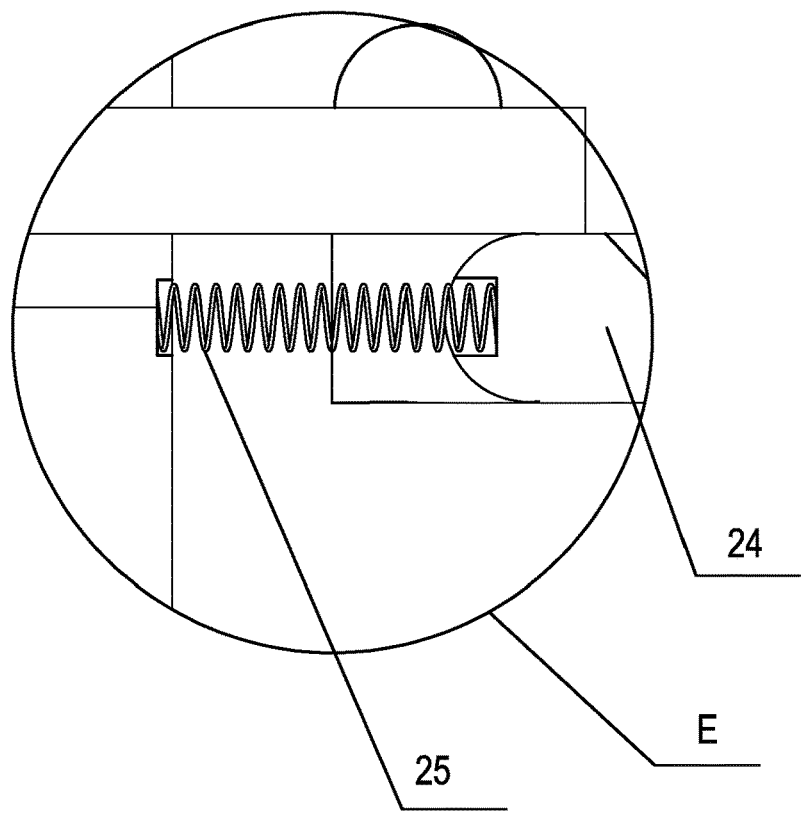
FIG. 15 is an enlarged view of the structure at position E in FIG. 14.
Figure 16:
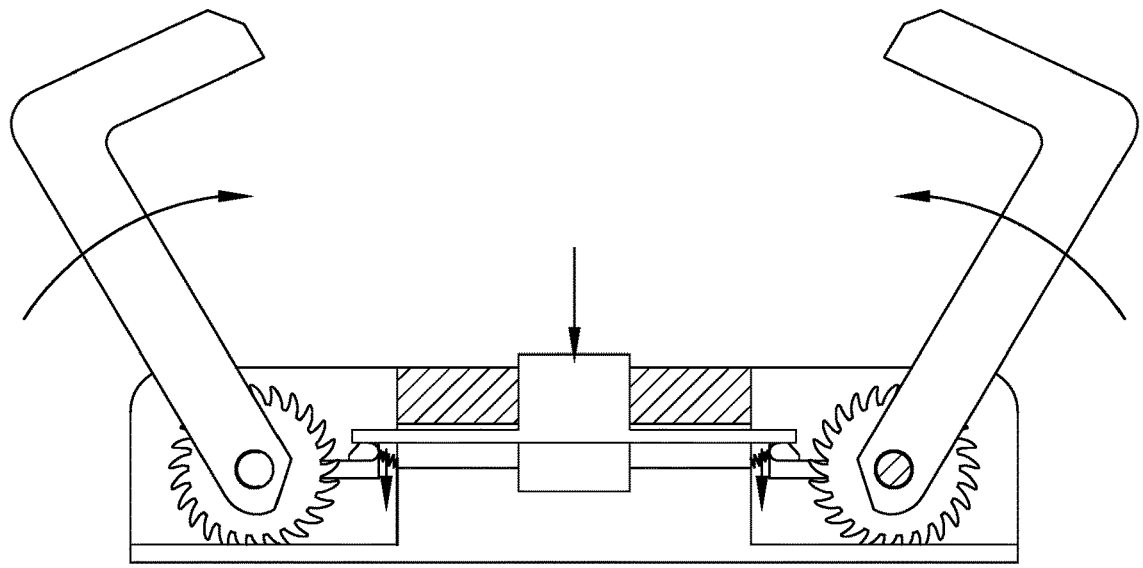
FIG. 16 is a schematic diagram of the reverse movement structure of the automatic connecting device.

As shown in FIGS. 10, 11 and 12, the photovoltaic module 10 comprises a reinforced crossbeam 13, a roof support 14, a thin crossbeam 15, a thick crossbeam 16, a photovoltaic panel 17, and the reinforced crossbeam 13 is a square-shaped steel pipe, arranged on the I-shaped steel 11 and used to carry the load transmitted from the I-shaped steel 11. Part of the reinforced crossbeams is arranged in an array along the length direction of the wave-dissipating floating body 4 to form a lower reinforced crossbeam layer, while the other part of reinforced crossbeams is arranged on the lower reinforced crossbeam layer to form an upper reinforced crossbeam layer; the upper reinforced crossbeam layer and the lower reinforced crossbeam layer are vertically arranged and connected through an automatic connecting device 18; the roof support 14 is made of aluminium alloy, with a shape similar to the roof; the bottom of the roof support 14 is connected to the lower reinforced crossbeam layer through bolts and nuts; the upper reinforced crossbeam layer is located on both inner sides of the roof support 14, and the thin crossbeam 15 and thick crossbeam 16 are square pipe fittings made of aluminium alloy; the thin crossbeam 15 is arranged near the top of the roof support 14, and the thick crossbeam 16 is arranged near the bottom of the roof support 14; the size difference between thin crossbeam 15 and thick crossbeam 16 provides component support for the layout of the photovoltaic panel 17, and the photovoltaic panel 17 is arranged on the roof support 14 through the thin crossbeam 15 and the thick crossbeam 16. The walkway system 3 is arranged between the roof supports 14.

As shown in FIGS. 13, 14, 15 and 16, reinforced crossbeams are connected through an automatic connecting device 18, and the automatic connecting device 18 comprises a snap-on gripper 20, a base 21, a button 22, a ratchet 23, a firing pin 24 and a spring 25; the base 21 is arranged on the lower reinforced crossbeam layer, and both ends of the base 21 are provided with "L" shaped notches; the firing pin 24 is arranged in the "L" shaped notch; one end of the firing pin 24 is matched with the ratchet 23, and the other end of the firing pin 24 is connected with the spring 25; the spring 25 is arranged in the base 24, and the button 22 is inverted-T shaped; both the lower ends of the button 22 are in contact with the firing pin 24, and the ratchet 23 is connected to the snap-in gripper 20. The snap-in gripper 20 grips the photovoltaic module 10 through its own structure. During installation, the upper reinforced crossbeam layer is placed on the base 21. The lower structure of the button will press the firing pin down from the longitudinal notch to the transverse groove through its own weight by pressing the button 22. When the firing pin 24 reaches the transverse notch, it will be pushed towards the ratchet 23 under the action of the spring 25. The spring 25 is installed in the groove between the firing pin 24 and the base 21, and the snap-on gripper 20 and the ratchet 23 are fixedly connected to rotate together. At this point, the reed of the ratchet 23 rotates and clamps the upper reinforced crossbeam layer, and the firing pin 24 will prevent the ratchet 23 from rotating in the opposite direction.

Figure 17:
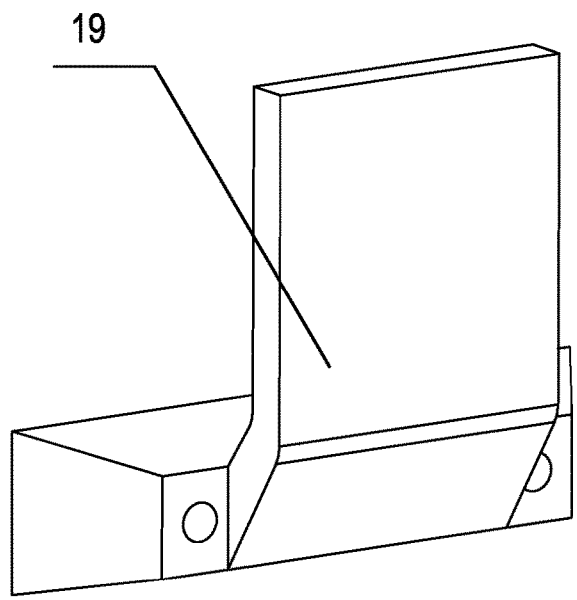
FIG. 17 is a schematic diagram of the stop device of the present invention.

As shown in FIG. 17, the joint between the lower reinforced crossbeam layer and the end of the upper reinforced crossbeam layer is provided with a stop device 19, and the stop device 19 is provided with bolt holes; the stop device 19 is connected with the lower reinforced crossbeam layer through bolts and nuts, and the protruding part on the upper part of the stop device 19 is provided with a stop block; the height of the stop block is greater than the height of the two reinforced crossbeam layers, which can limit the movement of the photovoltaic module 10 connected to the bayonet 20 of the automatic connecting device 18 along the length direction of the reinforced crossbeam.

Figure 18:
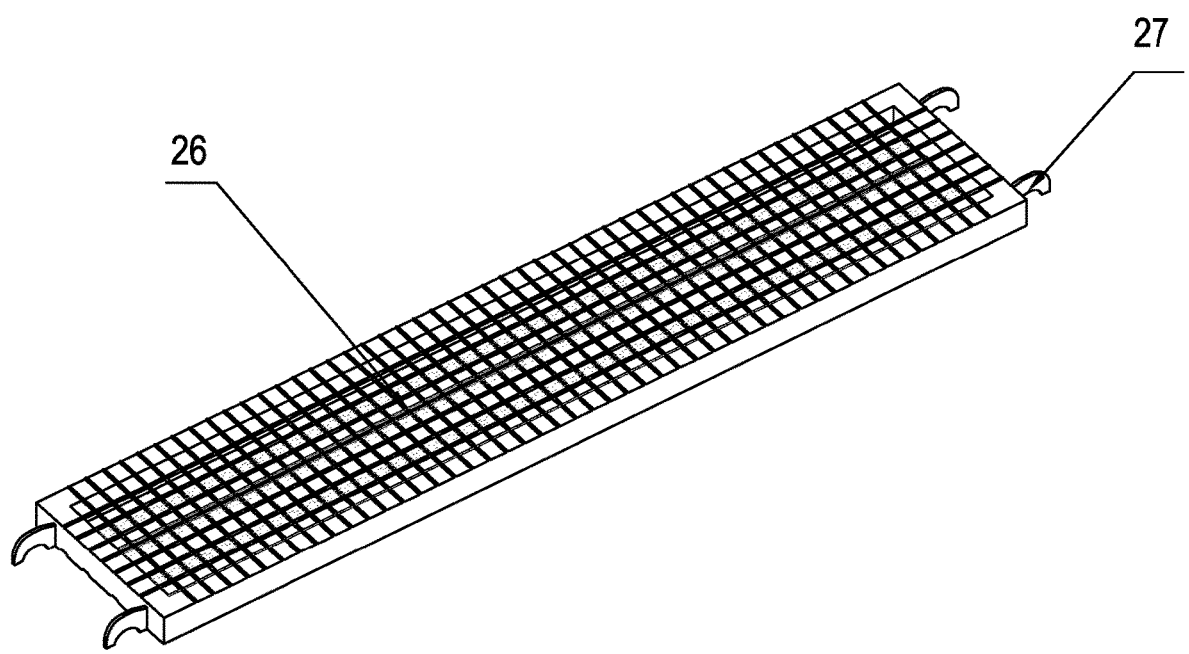
FIG. 18 is a structural diagram of the walkway system.
Figure 19:
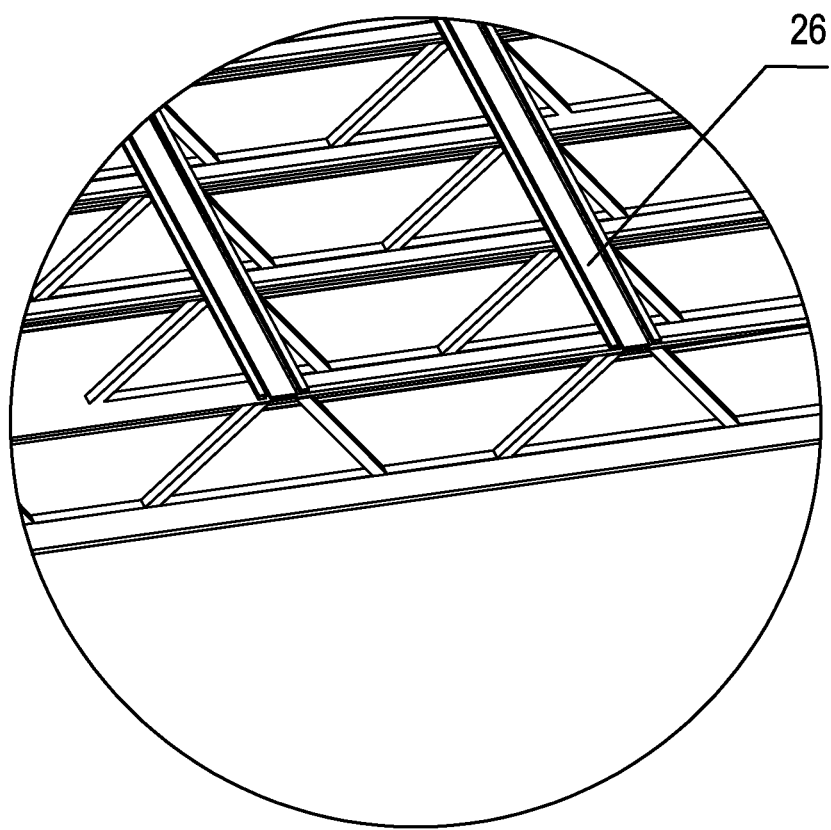
FIG. 19 is a layout diagram of the walkway system.

As shown in FIGS. 18 and 19, the walkway system 3 comprises several aluminum alloy walkway panels 26; both sides of the walkway panel 26 are provided with connecting structures 27 along the width direction, and the walkway panel is connected with the photovoltaic system 2 through the connecting structure 27. The walkway panel 26 is arranged between the roof supports 14 for later maintenance and replacement of photovoltaic modules 10.

Finally, it should be noted that the above embodiments are only used to explain the technical solution of the present invention and shall not be construed as limitation thereof; although the present invention is described in detail with reference to the embodiments, those of ordinary skill in the art shall understand that they may still modify the technical solution recorded in the embodiments or equivalently replace some or all of technical features. these modifications or replacements do not make the essence of the corresponding technical proposal break away from the range of technical proposal of the embodiments in the present invention.

What is claimed is:

1. A wave-dissipating and wave-resisting integrated floating photovoltaic device capable of resisting severe sea conditions, comprising at least two floating photovoltaic units, wherein the floating photovoltaic units are connected through connecting pieces to form a floating photovoltaic device, and the floating photovoltaic device is fixed through a mooring system, to ensure its safety under severe sea conditions; the floating photovoltaic device provides a protective zone with moderate sea conditions in a targeted sea area, for arranging other marine structures that cannot rely on themselves for wave dissipation and resistance; the connecting pieces may avoid collision between the floating photovoltaic units; the floating photovoltaic unit comprises a floating system, photovoltaic systems and a walkway system; the floating system is used for supporting the photovoltaic systems and bearing wave load impact; the photovoltaic systems are photovoltaic power generation systems of the floating photovoltaic device; the walkway system is arranged between the photovoltaic systems, and the walkway system provides convenience for later maintenance of the floating photovoltaic device;

the floating system is a wave-dissipating floating body arranged along a square area by resonant wave dissipation; several connecting columns are provided outside the four sides of the wave-dissipating floating body, and the connecting columns comprises two parallel protruding parts; a cylindrical rod is provided between the two protruding parts, and the cylindrical rod is perpendicular to the protruding part; the connecting column of the floating photovoltaic unit is connected with the connecting column of another floating photovoltaic unit through connecting pieces;

the photovoltaic system comprises a support structure and a photovoltaic module; the support structure comprises several I-shaped steels and several square-shaped steels, the square-shaped steels are arranged in a herringbone shape on the I-shaped steels in pairs; the wave-dissipating floating body is provided with several grooves on opposite sides; the I-shaped steels are arranged in an array along the length direction of the wave-dissipating floating body and embedded with the wave-dissipating floating body through the grooves, and the square-shaped steels are provided on the I-shaped steels to carry the photovoltaic module;

the photovoltaic module comprises several reinforced crossbeams, several roof supports, thin crossbeams, thick crossbeams, photovoltaic panels, wherein the thick crossbeams are thicker than the thin crossbeams; part of the reinforced crossbeams is arranged in an array along the length direction of the wave-dissipating floating body to form a lower reinforced crossbeam layer, while the other part of reinforced crossbeams is arranged on the lower reinforced crossbeam layer to form an upper reinforced crossbeam layer, the upper reinforced crossbeam layer and the lower reinforced crossbeam layer are vertically arranged and connected through an automatic connecting device, the several roof supports are arranged in an array on the lower reinforced crossbeam layer, and the upper reinforced crossbeam layer is located on both sides of the roof support, the thin crossbeam is arranged near the top of the roof support, and the thick crossbeam is arranged near the bottom of the roof support; the photovoltaic panel is arranged on the roof support through the thin crossbeam and the thick crossbeam.

2. The wave-dissipating and wave-resisting integrated floating photovoltaic device capable of resisting severe sea conditions according to claim 1, wherein the wave-dissipating floating body comprises two circular cross-section floating bodies and two square cross-section floating bodies; the two circular cross-section floating bodies are parallel and respectively arranged on a wave facing side and a back wave side, and the square cross-section floating bodies are connected to the two circular cross-section floating bodies; the square cross-section floating bodies are vertically connected to the circular cross-section floating bodies, and the wave-dissipating floating body is provided with a cross shaped square cross-section floating body in the middle.

3. The wave-dissipating and wave-resisting integrated floating photovoltaic device capable of resisting severe sea conditions according to claim 1, wherein the automatic connecting device comprises a snap-on gripper, a base, a button, a ratchet, a firing pin and a spring; the base is arranged on the lower reinforced crossbeam layer, and both ends of the base are provided with L shaped notches; the firing pin is arranged in the L shaped notch; one end of the firing pin is matched with the ratchet, and the other end of the firing pin is connected with the spring; the spring is arranged in the base, and the button is inverted-T shaped; both the lower ends of the button are in contact with the firing pin, and the ratchet is connected to the snap-on gripper.

4. The wave-dissipating and wave-resisting integrated floating photovoltaic device capable of resisting severe sea conditions according to claim 1, wherein a joint between the lower reinforced crossbeam layer and the end of the upper reinforced crossbeam layer is provided with a stop device, and the stop device is provided with bolt holes; the stop device is connected with the lower reinforced crossbeam layer through bolts and nuts, and the stop device is provided with a stop block; the height of the stop block is greater than the height of the two reinforced crossbeam layers.

5. The wave-dissipating and wave-resisting integrated floating photovoltaic device capable of resisting severe sea conditions according to claim 1, wherein the walkway system comprises several aluminum alloy walkway panels; both sides of the walkway panel are provided with connecting structures along the width direction, and the walkway panel is connected with the photovoltaic system through the connecting structure.

6. The wave-dissipating and wave-resisting integrated floating photovoltaic device capable of resisting severe sea conditions according to claim 1, wherein the connecting piece is a rubber ring.

* * * * *